United States Patent
Sun et al.

(10) Patent No.: US 9,900,904 B2
(45) Date of Patent: Feb. 20, 2018

(54) PREDICTIVE SCHEDULING FOR UPLINK TRANSMISSION IN A CELLULAR NETWORK

(71) Applicant: Telefonaktiebolaget LM Ericsson (publ), Stockholm (SE)

(72) Inventors: Ying Sun, Sundbyberg (SE); Martin Isaksson, Stockholm (SE); Fredrik Persson, Märsta (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 29 days.

(21) Appl. No.: 14/894,623

(22) PCT Filed: May 31, 2013

(86) PCT No.: PCT/EP2013/061282
§ 371 (c)(1),
(2) Date: Nov. 30, 2015

(87) PCT Pub. No.: WO2014/191050
PCT Pub. Date: Dec. 4, 2014

(65) Prior Publication Data
US 2016/0113031 A1  Apr. 21, 2016

(51) Int. Cl.
*H04W 72/12* (2009.01)
*H04L 29/06* (2006.01)
(Continued)

(52) U.S. Cl.
CPC ......... *H04W 72/1268* (2013.01); *H04L 69/16* (2013.01); *H04L 69/28* (2013.01);
(Continued)

(58) Field of Classification Search
CPC .................................................. H04W 72/1268
See application file for complete search history.

(56) References Cited

U.S. PATENT DOCUMENTS

| 5,771,235 A * | 6/1998 | Tang ..................... H04L 12/413 370/446 |
| 2007/0140165 A1 | 6/2007 | Kim et al. |
| 2008/0137618 A1 | 6/2008 | Sung et al. |

(Continued)

FOREIGN PATENT DOCUMENTS

| WO | WO 2008/076017 A1 | 6/2008 |
| WO | WO 2011/162502 A2 | 12/2011 |

OTHER PUBLICATIONS

International Search Report and Written Opinion of the International Searching Authority, Application No. PCT/EP2013/061282, Mar. 27, 2014.

(Continued)

*Primary Examiner* — John Blanton
(74) *Attorney, Agent, or Firm* — Sage Patent Group

(57) ABSTRACT

For controlling radio transmission in a cellular network, a network node detects data traffic between the cellular network and a user equipment. The detected data traffic is based on a transport protocol which involves transmission of an acknowledgement to acknowledge successful reception of data by the user equipment. The network node estimates a time at which sending of an future acknowledgement by the user equipment is expected. On the basis of the estimated time, the network node allocates UL radio resources to the user equipment. By sending an uplink grant, the network node may indicate the allocated uplink radio resources to the user equipment.

17 Claims, 11 Drawing Sheets

(51) Int. Cl.
*H04W 28/26* (2009.01)
*H04L 29/08* (2006.01)
*H04W 72/04* (2009.01)
*H04W 72/14* (2009.01)
*H04L 1/18* (2006.01)
*H04W 84/04* (2009.01)

(52) U.S. Cl.
CPC .......... *H04L 69/326* (2013.01); *H04W 28/26* (2013.01); *H04W 72/042* (2013.01); *H04W 72/0446* (2013.01); *H04W 72/14* (2013.01); *H04L 1/1861* (2013.01); *H04W 84/042* (2013.01)

(56) References Cited

U.S. PATENT DOCUMENTS

| | | | |
|---|---|---|---|
| 2010/0205310 A1* | 8/2010 | Altshuler | H04L 47/10 709/228 |
| 2012/0039169 A1* | 2/2012 | Susitaival | H04L 47/10 370/230 |
| 2013/0250765 A1* | 9/2013 | Ehsan | H04L 47/193 370/235 |

OTHER PUBLICATIONS

Allman et al., "TCP Congestion Control", Network Working Group, Request for Comments: 2581, Obsoletes: 2001; Category: Standards Track, Apr. 1999, 14 pp.

* cited by examiner

PREDICTIVE SCHEDULING FOR UPLINK TRANSMISSION IN A CELLULAR NETWORK

CROSS REFERENCE TO RELATED APPLICATION

This application is a 35 U.S.C. § 371 national stage application of PCT International Application No. PCT/EP2013/061282, filed on May 31, 2013, the disclosure and content of which is incorporated by reference herein in its entirety. The above-referenced PCT International Application was published in the English language as International Publication No. WO 2014/191050 A1 on Dec. 4, 2014.

TECHNICAL FIELD

The present invention relates to methods for controlling radio transmission in a cellular network and to corresponding devices.

BACKGROUND

In cellular networks, allocation of radio resources to a certain user equipment (UE), also referred to as scheduling, is typically accomplished dynamically on the network side. In the downlink (DL) direction from the cellular network to the UE, a network node may allocate radio resources in accordance with a need to transmit DL data to the UE. The network node may then inform the UE about the allocated resources by sending a DL assignment. For the uplink (UL) direction from the UE to the cellular network, a scheduling request which is sent by the UE to the cellular network may be used to indicate that the UE needs radio resources for sending UL data. An exemplary scenario based on the LTE (Long Term Evolution) radio access technology specified by 3GPP ($3^{rd}$ Generation Partnership Project) is illustrated in FIG. 1. To provide fast scheduling, a base station of the LTE radio access technology, referred to as "evolved Node B" (eNB) is responsible for the scheduling. This may be accomplished dynamically, taking into account the instantaneous traffic pattern and radio propagation characteristics of each UE.

As illustrated in FIG. 1, a UE 10 which needs to send UL data may first send a scheduling request 101 to an eNB 100 which serves the cell of the UE 10. The scheduling request 101 may be sent on a UL control channel, referred to as PUCCH (Physical Uplink Control Channel), providing dedicated resources for sending scheduling requests by the UE 10. Alternatively, the scheduling request 101 may be sent on a contention based random access channel (RACH). At step 102, the eNB 100 allocates UL radio resources to the UE 10. The amount of allocated resources may vary from between different scheduling transactions. The allocated UL radio resources are indicated in an UL grant 103, which is sent from the eNB 100 to the UE 10. Using the allocated UL radio resources, the UE 10 may then send the UL data 104 to the eNB 100. In addition, the UE 10 may also send a buffer status report indicating the amount of buffered UL data to be sent by the UE 10.

In the above process of transmitting the UL data 104, a delay occurs which is due to the sending of the scheduling request 101 before the UE 10 can proceed with the transmission of the UL data 104. However, such delay is not desirable in many cases. For example, certain data traffic may be sensitive to delay, such as data traffic associated with online gaming or the like.

To address such undesirable delays, it is known to use concepts of blind scheduling, in which UL radio resources are allocated to a UE without prior knowledge whether the UE has UL data to transmit or not. Such blind scheduling is for example described in WO 2011/162502 A2. Generally, blind scheduling of a UE suffers from the risk of wasting of radio resources which are allocated, but not needed by the UE. This may specifically be relevant in high-load situations, where the amount of available UL resources is scarce.

Accordingly, there is a need for techniques which allow for efficiently controlling radio transmissions in a cellular network, in particular with respect to the scheduling of UL transmissions.

SUMMARY

According to an embodiment of the invention, a method of controlling radio transmission in a cellular network is provided. According to the method, a network node detects data traffic between the cellular network and a UE. The detected data traffic is based on a transport protocol which involves transmission of an acknowledgement to acknowledge successful reception of data by the UE. The network node estimates a time at which sending of an future acknowledgement by the UE is expected. On the basis of the estimated time, the network node allocates UL radio resources to the UE. The network node indicates the allocated uplink radio resources to the UE.

According to a further embodiment of the invention, a network node for a cellular network is provided. The network node comprises an interface for transmission of data packets with respect to a UE and at least one processor. The at least one processor is configured to detect data traffic between the cellular network and the UE. The detected data traffic is based on a transport protocol which involves transmission of an acknowledgement to acknowledge successful reception of data by the UE. Further, the at least one processor is configured to estimate a time at which sending of an future acknowledgement by the UE is expected. Further, the at least one processor is configured to allocate UL radio resources to the UE. This is accomplished on the basis of the estimated time. Further, the at least one processor is configured to indicate the allocated UL radio resources to the UE.

According to a further embodiment of the invention, a computer program is provided. The computer program comprises program code to be executed by at least one processor of a network node of a cellular network. Execution of the program code causes the network node to detect data traffic between the cellular network and the UE. The detected data traffic is based on a transport protocol which involves transmission of an acknowledgement to acknowledge successful reception of data by the UE. Further, execution of the program code causes the network node to estimate a time at which sending of an future acknowledgement by the UE is expected. Further, execution of the program code causes the network node to allocate UL radio resources to the UE. This is accomplished on the basis of the estimated time. Further, execution of the program code causes the network node to indicate the allocated UL radio resources to the UE.

DETAILED DESCRIPTION OF EMBODIMENTS

Figure 1:
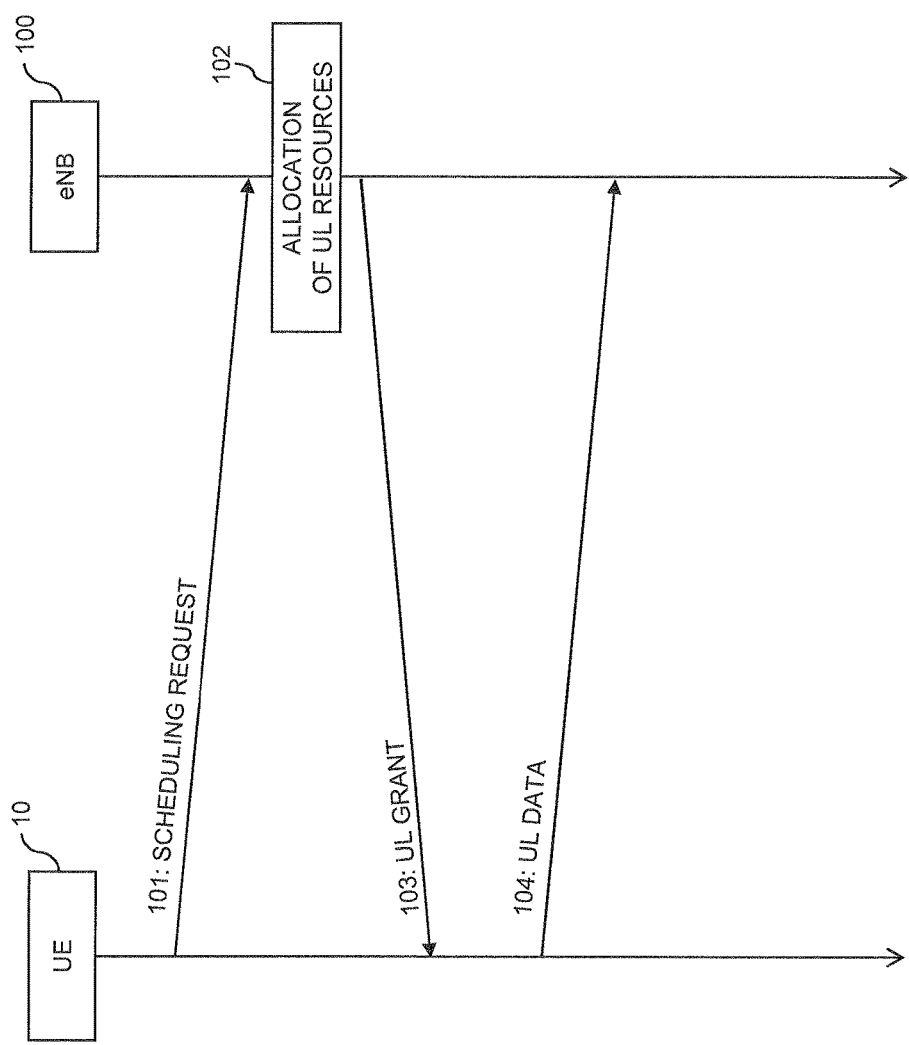
FIG. 1 schematically illustrates an exemplary process for performing a UL radio transmission from a UE to a cellular network.

In the following, concepts in accordance with exemplary embodiments of the invention will be explained in more detail and with reference to the accompanying drawings. The illustrated embodiments relate to concepts for controlling radio transmission in a cellular network. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, characteristics of a transport protocol which involves sending of an acknowledgment (ACK) to acknowledge receipt of data by a UE are utilized to allocate UL radio resources to the UE. An example of such transport protocol is the Transmission Control Protocol (TCP) as specified in IETF RFC 793. Specifically, data traffic of the UE which is based on such transport protocol may be detected, and a network node which is responsible for scheduling, e.g., an eNB, may then estimate a time and typically also a size of a future ACK to be transmitted by the UE. The estimation may be based on parameters of the transport protocol, but also on other information available in the cellular network, e.g., information from Active Queue Management (AQM) for a radio link between the cellular network and the UE or information relating to a retransmission protocol implemented on the radio link between the UE and the cellular network. The estimated time, and optionally also size, may then be used as a basis for allocating UL radio resources to the UE and sending an UL grant to the UE. This may also be referred to as predictive scheduling for UL transmission of ACKs.

By using the time, and optionally also size, of the expected future ACK as basis for allocating the UL radio resources and sending the UL grant, delays due to waiting for a scheduling request from the UE can be avoided. Specifically, the scheduling can be performed already before such scheduling request is sent by the UE, so that sending of the scheduling request by the UE is no longer needed. At the same time, the likelihood of unnecessary allocations can be kept small, because the sending of the ACK can be predicted due to the characteristics of the transport protocol.

In the following, the concepts will be explained in more detail by referring to the LTE radio access technology and to the TCP. The TCP is one of the most commonly used transport protocols in Internet Protocol (IP) based communication networks, such as the Internet. The TCP is for example the primary end-to-end transport layer protocol in the Internet for non-real time data, including data arising from, e.g., web browsing, file downloading, or e-mail applications. The TCP requires that the TCP receiver returns a positive acknowledgment (ACK) to the TCP sender to acknowledge receipt of data. If the ACK is not received within a timeout interval, the data is retransmitted by the TCP sender. In this way, the TCP adds reliability to the IP protocol.

Figure 2:
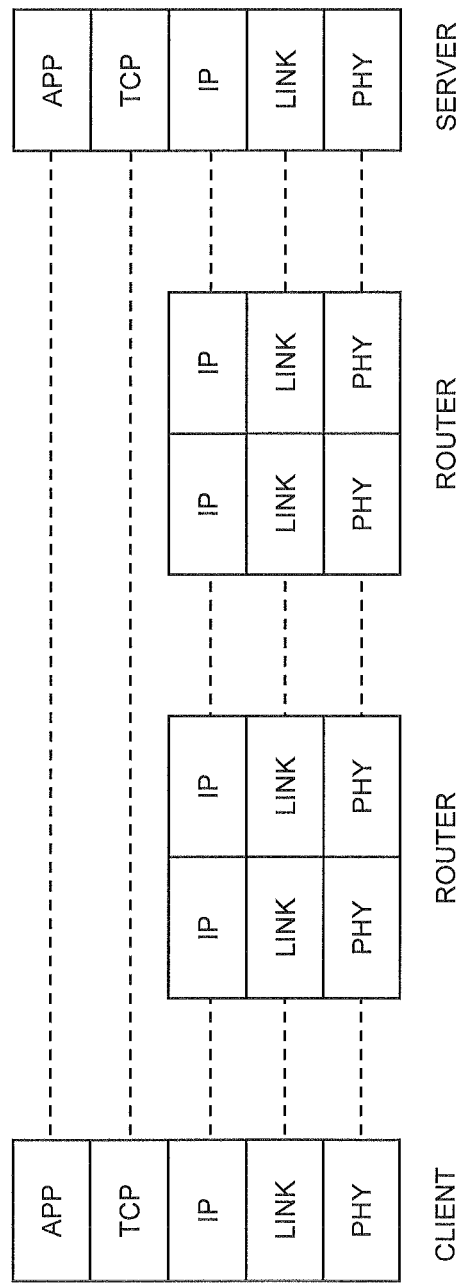
FIG. 2 schematically illustrates an exemplary protocol stack which may be used in an embodiment of the invention.

In addition, the TCP may provide in order delivery of data and network congestion control as specified in IETF RFC 5681. FIG. 2 schematically illustrates an exemplary protocol stack which can be used for data transmission between a server and a client in accordance with the illustrated concepts. As can be seen, the TCP layer is implemented at the server and the client, between an application layer and the IP layer. Lower protocol layers include a link layer and a physical (PHY) layer. In the illustrated cellular network scenarios, the client may correspond to a UE which accesses the server via a packet based radio connection.

Figure 3:
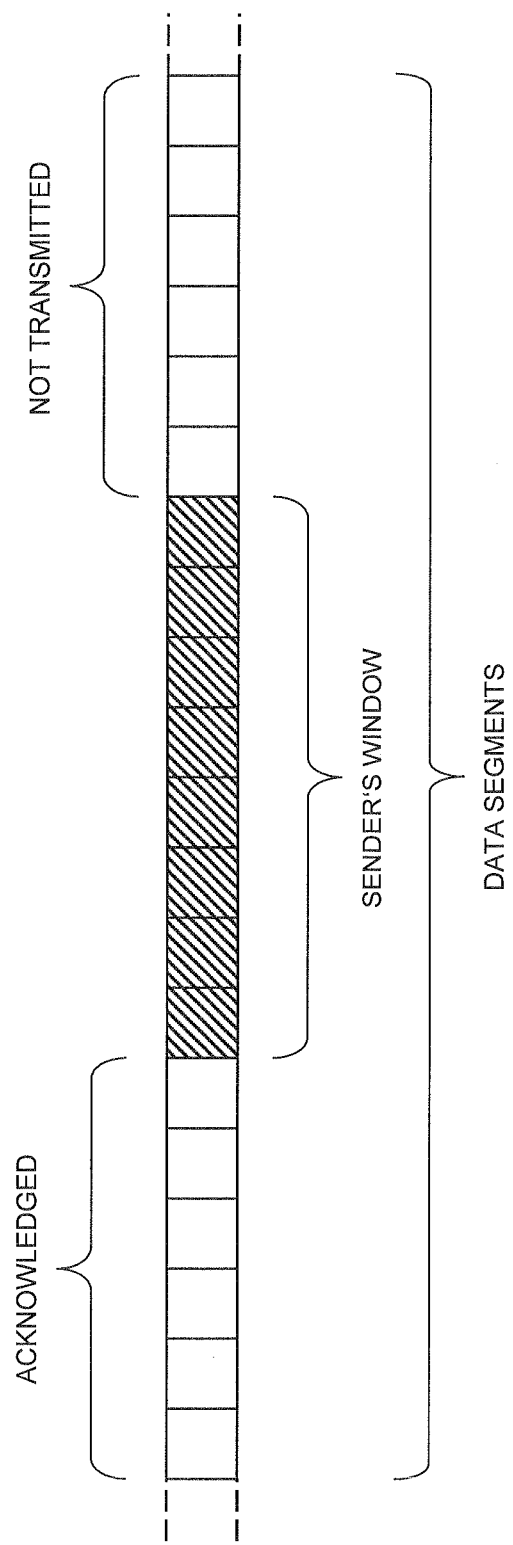
FIG. 3 schematically illustrates a sender's window of a transport protocol which may be used in an embodiment of the invention.

The TCP is a sliding window protocol. In particular, it uses a sender's window which includes data which the sender is currently allowed to send. The sender's window is based on a receive window (rwnd) as advertised by the receiver a congestion window (cwnd) calculated by the congestion control algorithm implemented at the sender. According to IETF RFC 5681, the size of the sender's window is defined as the minimum of the advertised receiver window and the congestion window. FIG. 3 schematically illustrates the sender's window.

Figure 4:
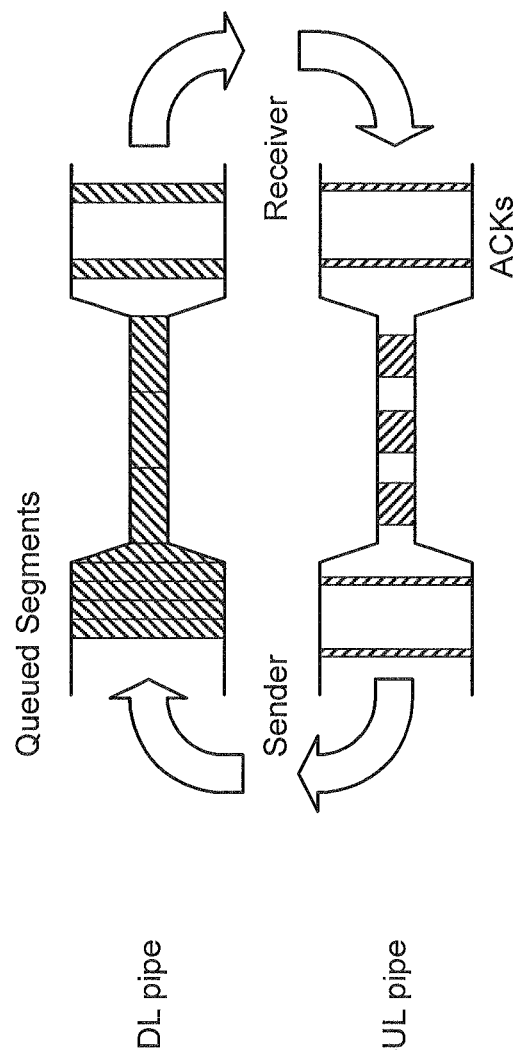
FIG. 4 schematically illustrates self-clocking of transmissions according to a transport protocol which may be used in an embodiment of the invention.

When the sender receives a TCP ACK, it can transmit as many new segments as were acknowledged. The new segments will be conveyed towards the receiver and they will be acknowledged at a later time. The spacing of the ACKs may be used to determine the rate at which new segments are sent. The latter mechanism is also referred to as self-clocking. An example of self-clocking is illustrated in FIG. 4. In the example of FIG. 4, a congestion is due to a bigger data pipe feeding a smaller data pipe. The rate at which the TCP segments flow through a DL pipe from the sender to the receiver is also the rate at which the ACKs are sent through an UL pipe back to the sender.

Figure 5:
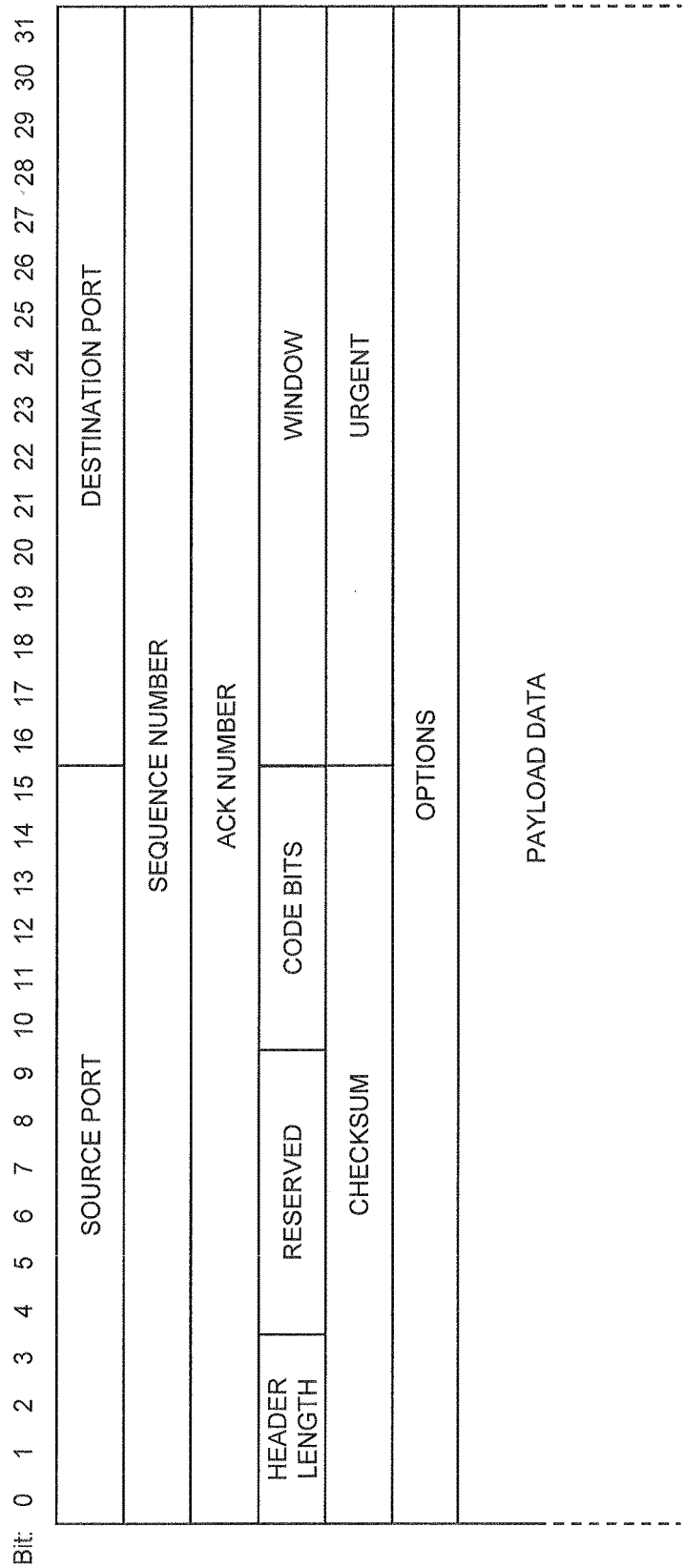
FIG. 5 schematically illustrates a protocol header of a transport protocol which may be used in an embodiment of the invention.

A header of a TCP segment is used to convey information between the TCP sender and the TCP receiver. This information includes, e.g., window size, a segment sequence number, and an ACK number. The structure of the TCP header is schematically illustrated in FIG. 5. An option field in the TCP header may be used to specify the use of certain protocol options. Such options for example include a Time Stamp option, which may be used to obtain an estimate of a TCP Round Trip Time (RTT), a maximum segment size (MSS), or a Selective Acknowledgement (SACK) option. Indications about the use of options are typically only transmitted during the initial SYN and SYN/ACK phase of a 3-way handshake which is performed according to the TCP performs to establish a connection. The TCP ACKs returned from the receiver to the sender contain no payload data but only the TCP header.

In many cases, a TCP sender does not have direct knowledge about the capacity of a certain data pipe which forms a bottleneck in the TCP connection path. The sender may therefore probe the pipe capacity or bottleneck data rate. For this purpose, the TCP provides various types of indications. For example, if a TCP ACK is received, this may be regarded as an indication that more bandwidth is available. If a segment is dropped, this may be regarded as an indication of a light congestion. If there is a plurality of dropped segments or a connection time-out, this may be regarded as an indication of a serious congestion. The TCP sender may react to such indications by changing the sender's window size or by starting over with the initial settings.

The TCP congestion control provides four congestion control algorithms: a slow start algorithm, a congestion avoidance algorithm, a fast retransmit algorithm, and a fast recovery algorithm. The slow start algorithm and the congestion avoidance algorithm may be regarded as independent algorithms with different objectives. However, in practice slow start algorithm and the congestion avoidance algorithm are often implemented together. The congestion avoidance algorithm probes for more bandwidth in a linear fashion by increasing the congestion window by 1/cwnd every time a TCP ACK is received. In the slow start algorithm, the congestion window is increased by one segment every time an ACK is received. This increases the size of the sender's window in an exponential manner until a congestion is experienced. In this phase, the behavior is strongly dependent on the TCP RTT, i.e., the time interval between sending data and receiving the TCP ACK for this data. Specifically, starting from an initial window size IW there will be $$n = \left\lceil \log_2\left(\frac{PC}{IW}\right) \right\rceil, \quad (1)$$

transactions of sending TCP data and receiving the corresponding TCP ACK, each requiring a TCP RTT, until the pipe capacity PC (expressed in the same units as the window size) is reached and congestion is experienced. In typical scenarios of a TCP connection established by a UE via the cellular network, n may be 8 or even larger.

Accordingly, improvements in the TCP RTT may have a significant effect on end user performance. If the TCP receiver is implemented in a UE which communicates with the TCP sender via the cellular network, a short TCP RTT may be achieved as outlined above, by using the time, and optionally also size, of the expected future TCP ACK as basis for allocating UL radio resources and sending the UL grant to the UE. In this case, a contribution from sending and processing a scheduling request to the TCP RTT may be avoided. This contribution to the TCP RTT by about 14 ms. Accordingly, for TCP sessions which reach the pipe capacity a time gain of about 8×14 ms=112 ms can be achieved. For short TCP sessions in which the pipe capacity is not reached, the time gain is proportional to the number of TCP data/TCP ACK transactions in the TCP session. For example, assuming a TCP session with five TCP data/TCP ACK transactions, the time gain would be 70 ms. This can be about 50% of the total duration of the TCP session.

Figure 6:
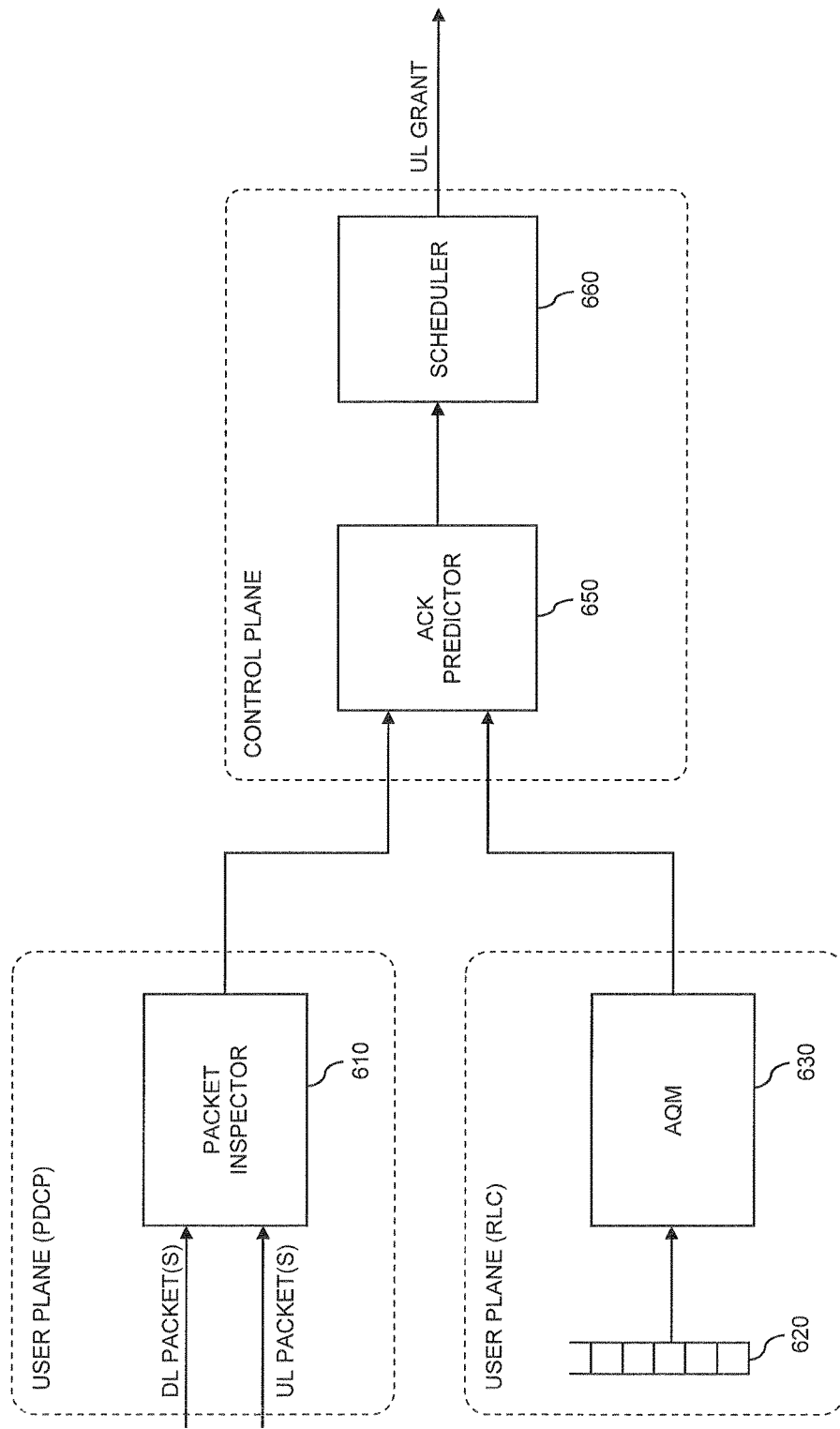
FIG. 6 shows a block diagram for illustrating functionalities for performing predictive scheduling of UL radio transmissions according to an embodiment of the invention.

FIG. 6 shows a block diagram for illustrating functionalities for scheduling on the basis of predicted TCP ACKs. The functionalities may be implemented in a network node which is responsible for the scheduling, e.g., in an eNB.

As illustrated, the functionalities include a packet inspector 610, ACK predictor 650, and a scheduler 660. The packet inspector 610 may be implemented in the user plane, in particular on the layer of the Packet Data Convergence Protocol (PDCP). The packet inspector 610 may be based on shallow packet inspection techniques for analyzing the IP and TCP headers of incoming DL and/or UL data packets. The ACK predictor 650 and the scheduler 660 may be implemented in the control plane.

In addition, an AQM functionality 630, related to a transmit queue 620 for the radio link between the UE and the cellular network may be utilized. As illustrated, the AQM functionality 630 may be located in the user plane, in particular on the Radio Link Control (RLC) layer.

The packet inspector 610 analyzes data traffic of a certain UE to identify TCP flows, i.e., a sequence of data packets transmitted between the same TCP end-points. A TCP flow may be identified by means of a protocol identifier in the IP header of the data packet. For data packets of the same TCP flow, the headers of the data packets indicate the same source and destination IP addresses and the same source and destination TCP ports, which may be used for distinguishing different TCP flows from each other. Upon detecting a TCP flow, the packet inspector 610 may further analyze information in the TCP header to determine the window size, estimate the TCP RTT, and obtain information for estimating the size of a future TCP ACK. For such analysis, specifically the first data packets of a TCP flow may provide valuable information, namely the SYN packet which is initially transmitted from the TCP sender to the TCP receiver, and the SYN ACK packet which is returned from the receiver to the sender in response to the SYN ACK packet.

For example, the TCP SYN packet may provide information on the TCP options to be applied for this TCP flow. Inspection of later data packets of the TCP flow may provide further information on when or how such TCP options are used. By way of example, such information may relate to the application of one or more TCP options, e.g., the SACK option. The application of one or more TCP options influences the size of the TCP ACKs. While an ordinary ACK contains the first 20 bytes of the TCP header as illustrated in FIG. 5, but not the options field, the TCP ACK in the case of one or more applied TCP options can be up to 40 bytes. By analyzing TCP sequence numbers of data packets and ACKs, size of the next TCP ACK can be estimated, even if the SACK option or some other TCP option is applied so that ACK sizes may vary. The TCP RTT may be estimated from the time sending a TCP data packet toward the UE and the time of receiving the corresponding TCP ACK from the UE, whereby the correspondence of TCP data packet and TCP ACK can be identified by means of the sequence number. Additional transmission delays between the packet inspector 610 and the TCP sender may be estimated as well, e.g., by probing the IP connection to the sender using Ping messages.

In addition or as an alternative, the TCP RTT may also be estimated from other information available in the cellular network. For example, information related to a retransmission protocol used on a radio link between the UE and the cellular network could be utilized. For example, in the LTE radio access technology, a Hybrid Automatic Repeat Request (HARQ) protocol is used on the radio link between the UE and the eNB. The working point of such retransmission protocol, could be used to obtain an estimate for the TCP RTT which is based on the number nr of HARQ retransmissions required for a packet. For example, a HARQ RTT may be specified to be 8 ms. If it is assumed that nr HARQ retransmissions and the TCP RTT are required to successfully transmit and acknowledge TCP data, then the actual inter-arrival time of TCP data is the TCP RTT minus nr times the HARQ RTT. Accordingly, the TCP RTT can be estimated from the HARQ working point, given by nr, and the inter-arrival time of TCP data.

The TCP RTT could also be estimated by some other node carrying the user plane traffic between the TCP sender and the UE or by the TCP sender itself. The TCP RTT could then be indicated to the network node which is responsible for the scheduling of UL radio resources.

The ACK predictor 650 operates to predict the time at which the UE sends a future TCP ACK, in particular the next TCP ACK of the detected TCP flow. In addition, the ACK predictor 650 may also estimate the size of the future ACK. For this purpose, the ACK predictor may use the information provided by the packet inspector 610, e.g., the estimated RTT, the TCP window size, the size of detected TCP ACKs, or the like.

In addition, the ACK predictor 650 may also utilize information from the AQM functionality 630, e.g., the size of data packets adjusted by the AQM functionality 630 in the case of a congestion on the radio link, or the time of discarding a data packet.

The estimation of the time at which the UE sends the future TCP ACK may in particular involve estimating a time of sending an UL grant to the UE, so that the UL grant is available at the UE when it needs to send the future TCP ACK, i.e., when the TCP ACK becomes available in the UE's transmit buffer for the radio link. The time of sending the UL grant may be estimated in terms of a waiting time TW between sending TCP data to the UE and sending the UL grant to the UE. Exemplary processes illustrating different ways of estimating the waiting time TW are explained below in connection with FIGS. 7 to 9.

The estimation of the size of the future TCP ACK is based on the information provided by the packet inspector 610 or on the information provided by the AQM functionality 630. For example, the size of the future TCP ACK, $S_{ACK}$, may be estimated as $$S_{ACK}=\min(S_I, S_A), \quad (2)$$

where $S_I$ is the size of TCP ACKs detected by the packet inspector 610 and $S_A$ is the data packet size as adjusted by the AQM functionality 630 in the case of a congestion on the radio link. From the estimated size $S_{ACK}$, the ACK predictor 650 may determine size of the UL grant, i.e., an appropriate amount of UL radio resources for transmitting the TCP ACK on the radio link between the UE and the cellular network. The size SG of the UL grant may for example be determined according to $$S_G=S_{ACK}+OH, \quad (3)$$

where OH is a parameter for taking into account an overhead for transmission on the radio link. The parameter OH may for example be preconfigured or may be dynamically estimated one the basis of the size of transmitted data packets.

Accordingly, the ACK predictor 650 may provide the scheduler 660 with an estimated time for sending an UL grant, and optionally also with an estimated size for the UL grant. The scheduler 660 may then use this information to generate the UL grant, i.e., to correspondingly allocate UL radio resources to the UE and indicate the allocated UL radio resources in the UL grant which is transmitted to the UE.

Figure 7:
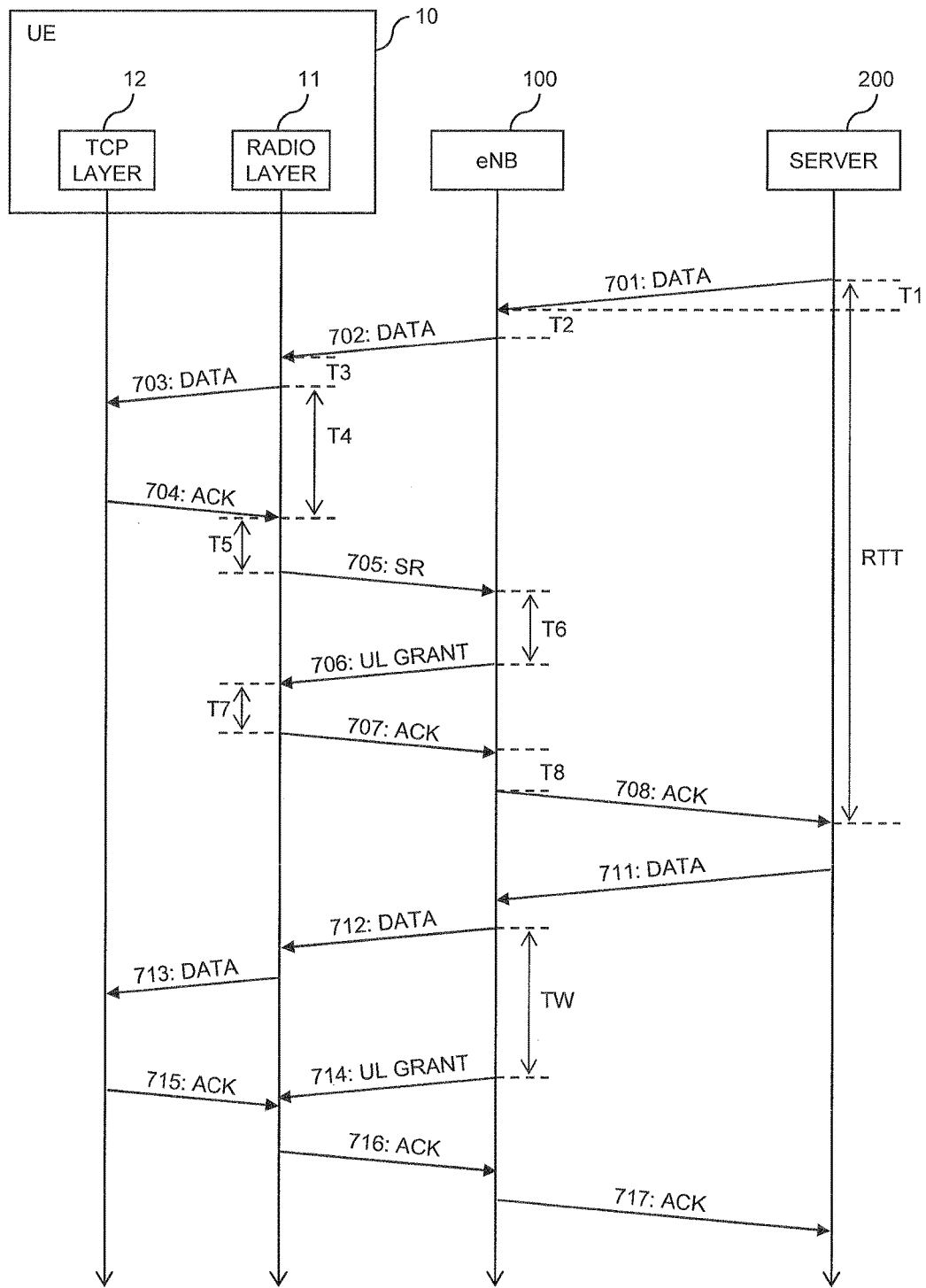
FIG. 7 shows a signaling diagram for illustrating an exemplary data transmission process in accordance with an embodiment of the invention.

FIG. 7 schematically illustrates a process of data transmission in accordance with the above principles. The illustrates process involves the UE 10, the eNB 100, and a server 200. The server 200 acts as the TCP sender and sends TCP data to the UE 10. The server 200 may be the original source of the TCP data or may be a proxy server which caches and/or relays the TCP data. The eNB 100 is responsible for scheduling transmissions on the radio link between the UE 10 and the cellular network and at the same time also conveys the TCP data between the UE 10 and the server 200. That is to say, the radio link between the UE 10 and the cellular network is in this example established via the eNB 100. The eNB 100 may implement the above-mentioned functionalities of the packet inspector 610, the ACK predictor 650, and the scheduler 660. Further, the eNB 100 may also implement the transmit queue 620 and the AQM functionality 630. As further illustrated, the UE 10 is provided with a radio layer 11 for performing transmissions on the radio link between the UE 10 and the eNB 100 and with a TCP layer 12 for performing transmissions according to the TCP.

At the beginning of a new TCP session, the server 200 may send TCP data 701 to the eNB 100. The TCP data 701 may for example be a TCP SYN. A transmission delay associated with the transmission of the TCP data 701 from the server 200 to the eNB 100 is denoted by T1.

The eNB 100 processes the TCP data 701 and forwards the processed TCP data 702 to the UE 10. The delay associated with the processing in the eNB 100 is denoted by T2.

The radio layer 11 in the UE 10 receives the TCP data 702, processes the TCP data 702, and forwards the processed TCP data 703 to the TCP layer 12. The delay associated with the processing in the radio layer 11 is denoted by T3.

The TCP layer 12 in the UE processes the TCP data 703 and, at some point, decides to return a TCP ACK 704. If the TCP data 701 correspond to a TCP SYN, the TCP ACK 704 may correspond to a TCP SYN ACK. The TCP layer 12 generates the TCP ACK and forwards it to the radio layer 11. The delay associated with the generation of the TCP ACK in the TCP layer 12 is denoted by T4.

Having received the TCP ACK 704, the radio layer 11 decides to send a scheduling request (SR) 705 to the eNB 100. The delay associated with the generation and sending of the scheduling request 705 by the radio layer is denoted by T5. This delay mainly due to the UE 10 having to wait for the next opportunity to send the scheduling request 705.

The eNB 100 receives the scheduling request 705 and responds by sending an UL grant 706 to the UE 10. The UL grant indicates UL radio resources allocated to the UE 10. The delay associated with the decoding of the scheduling request 705 and generation of the UL grant 706 is denoted by T6.

The radio layer 11 in the UE 10 receives the UL grant 705. After a given time interval denoted by T7, the radio layer 11 may then proceed by using the allocated UL radio resources for sending the TCP ACK 707 to the eNB 100. In the LTE radio access technology, T7 is specified to be 4 ms.

The eNB 100 processes the TCP ACK 707 and forwards the processed TCP ACK 708 to the server 200. The delay associated with the processing in the eNB 100, in particular with the decoding of the radio transmission from the UE 10, is denoted by T8.

FIG. 7 illustrates the TCP RTT for the TCP data 701, which is the time interval between sending the TCP data 701 by the server 200 and receiving the TCP ACK 708 at the server 200.

On the basis of the TCP RTT for the TCP data 701, which includes the additional delay for sending the scheduling request 705, the above-mentioned waiting time TW can be estimated. This may be accomplished according to:

$$TW = RTT - 2T1 - T2 - T5 - T6 - T7 - T8 - 3T_A - M, \quad (4)$$

where $T_A$ denotes the delay associated with a radio transmission between the UE 10 and the eNB 100, and M is a configurable margin.

As mentioned above, the TCP RTT may be measured by the eNB 100 or some other node. The delay T1 can be measured by probing the transmission delay from the eNB 100 to the server 200, e.g., by sending a Ping message.

Figure 8:
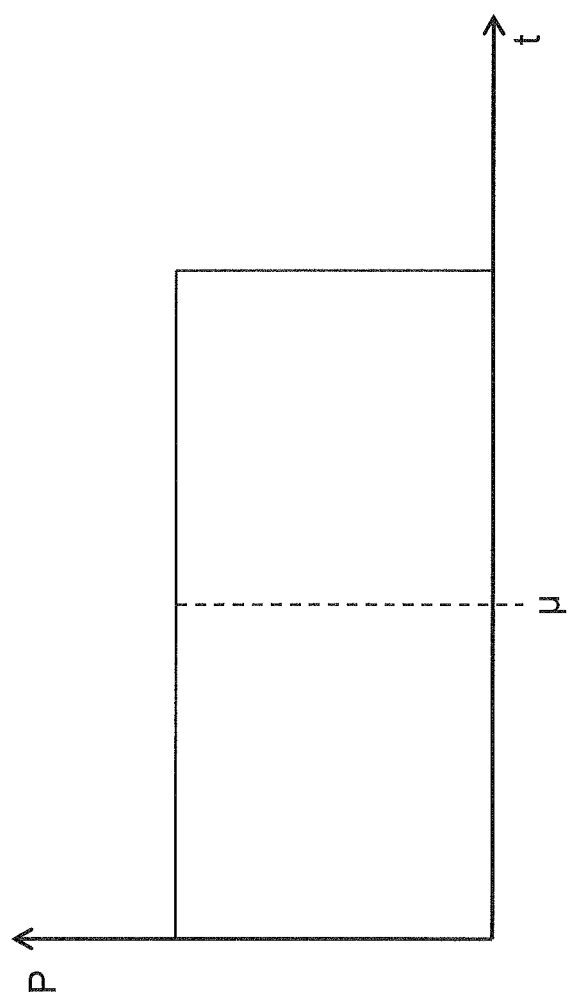
FIG. 8 shows an exemplary probability distribution which may be utilized in estimation of the time for sending an UL grant to the UE.

The delay T5 between availability of the TCP ACK 704 in the radio layer and sending the scheduling request may be assumed to be a random integer with a uniform probability distribution in the range of $[0, P_{SR}]$, where $P_{SR}$ denotes the scheduling request periodicity. An exemplary probability distribution for T5 is illustrated in FIG. 8. The scheduling request periodicity may be configured by the eNB 100 and indicated to the UE 10 using Radio Resource Control (RRC) signalling. The expected value μ for T5 may be preconfigured in the eNB or may be estimated from the configuration of the eNB 100, e.g., from the scheduling request periodicity. An estimation of the probability distribution or of its parameters, such as the expected value μ could also be performed in a dedicated measurement mode which ensures that the scheduling request triggered by a particular data transmission is evaluated. Such estimation results could be provided for a particular UE, for a particular UE type, for a particular cell of the cellular network, for a particular eNB, or the like.

For $T_A$, a typical value of 1 ms may be assumed. The delays T6 and T8 in turn depend on the processing power of the eNB 100 and may be estimated for this particular eNB 100 or eNB type. Typically, the values of T6 and T8 are in the range of a few ms. The values of T6 and T8 are typically known to the eNB 100 itself.

Having estimated the waiting time TW, the eNB 100 may use this information for predictively sending UL grants to be used for future TCP ACKs from the UE 10.

As illustrated, the server 200 may send further TCP data 711 towards the UE 10. The eNB 100 processes the TCP data 711 and forwards the processed TCP data 712 to the UE 10. When sending the TCP data 712, the eNB 100 may also start a timer with the duration of the waiting time TW. The radio layer 11 in the UE 10 receives the TCP data 712, processes the TCP data 712, and forwards the processed TCP data 713 to the TCP layer 12.

After expiry of the timer, the eNB 100 sends an UL grant 714 to the UE 10. This UL grant is intended to be used by the UE 10 for sending the expected TCP ACK 715. The UL grant allocates UL radio resources to the UE 10. The amount of allocated resources may be estimated as explained above.

The TCP layer 12 in the UE 10 processes the TCP data 713 and, as expected, decides to return the TCP ACK 715. The TCP layer 12 generates the TCP ACK 715 and forwards it to the radio layer 11.

At the time the TCP ACK 715 is received at the radio layer 11, also the UL grant 714 was received by the radio layer 11. Accordingly, UL radio resources for sending the TCP ACK 715 are already available at the UE 10, and sending of a scheduling request is not needed at this point. Rather, the radio layer 11 in the UE 10 may proceed by using the allocated UL radio resources for sending the TCP ACK 716 to the eNB 100.

The eNB 100 processes the TCP ACK 716 and forwards the processed TCP ACK 717 to the server 200. As can be seen, the early sending of the UL grant 714 to the UE 10 provides a significantly shorter RTT between sending the TCP data 711 by the server 200 and receiving the TCP ACK 717 at the server 200.

For further TCP data, the sequence from sending the TCP data 711 to receiving the TCP ACK 717 may be repeated.

Figure 9:
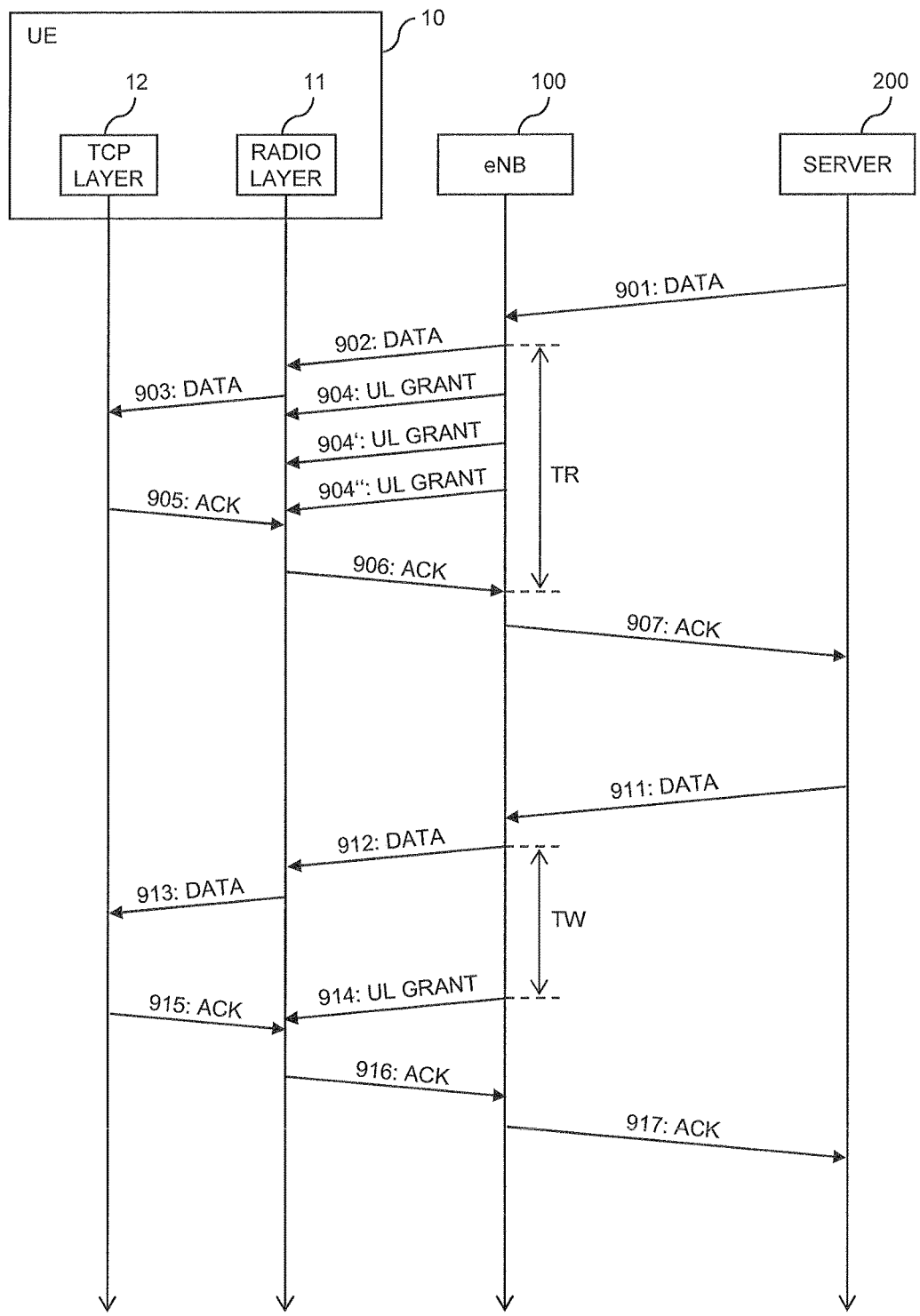
FIG. 9 shows a signaling diagram for illustrating a further exemplary data transmission process in accordance with an embodiment of the invention.

The process of FIG. 9 is similar to that of FIG. 7, but uses a different way of estimating the waiting time TW.

In the process of FIG. 9, the server 200 sends TCP data 901 towards the UE 10. The TCP data 901 may for example be a TCP SYN.

The eNB 100 processes the TCP data 901 and forwards the processed TCP data 902 to the UE 10. The radio layer 11 in the UE 10 receives the TCP data 902, processes the TCP data 902, and forwards the processed TCP data 903 to the TCP layer 12.

Sending of the TCP data 902 to the UE 10 also triggers the eNB 100 to regularly send UL grants 904, 904', 904" to the UE 10. This sending of UL grants may be performed according to a predefined pattern which is based on typical behavior of UEs with respect to the sending of TCP ACKs, e.g., based on previous estimations of the waiting time TW.

The TCP layer 12 in the UE processes the TCP data 903 and, at some point, decides to return the TCP ACK 905. The TCP layer 12 generates the TCP ACK 905 and forwards it to the radio layer 11.

At the time the TCP ACK 905 is received at the radio layer 11, at least one of the UL grants 904, 904', 904" was already received by the radio layer 11. Accordingly, UL radio resources for sending the TCP ACK 905 are already available at the UE 10, and sending of a scheduling request is not needed at this point. Rather, the radio layer 11 in the UE 10 may proceed by using the allocated UL radio resources for sending the TCP ACK 906 to the eNB 100.

The eNB 100 processes the TCP ACK 906 and forwards the processed TCP ACK 907 to the server 200.

A time interval TR between sending the TCP data 902 by the eNB 100 and receiving the TCP ACK 906 at the eNB 100 may be measured by the eNB 100. From this time interval TR, the waiting time TW may be determined, e.g., according to:

$$TW = TR - T7 - 3T_A M. \quad (5)$$

As mentioned above, T7 is specified to be 4 ms in the LTE radio access technology, and $T_A$ may be assumed to be 1 ms. Again, M is a configurable margin.

The server 200 may then continue with sending further TCP data 911 towards the UE 10. The eNB 100 processes the TCP data 911 and forwards the processed TCP data 912 to the UE 10. When sending the TCP data 912, the eNB 100 also starts a timer with the duration of the waiting time TW. The radio layer 11 in the UE 10 receives the TCP data 912, processes the TCP data 912, and forwards the processed TCP data 913 to the TCP layer 12.

After expiry of the timer, the eNB 100 sends an UL grant 914 to the UE 10. This UL grant is intended to be used by the UE 10 for sending the expected TCP ACK 915. The UL grant allocates UL radio resources to the UE 10. The amount of allocated resources may be estimated as explained above.

The TCP layer 12 in the UE 10 processes the TCP data 913 and, as expected, decides to return the TCP ACK 915. The TCP layer 12 generates the TCP ACK 915 and forwards it to the radio layer 11.

At the time the TCP ACK 915 is received at the radio layer 11, also the UL grant 914 was received by the radio layer 11. Accordingly, UL radio resources for sending the TCP ACK 915 are already available at the UE 10, and sending of a scheduling request is not needed at this point. Rather, the radio layer 11 in the UE 10 may proceed by using the allocated UL radio resources for sending the TCP ACK 916 to the eNB 100.

The eNB 100 processes the TCP ACK 916 and forwards the processed TCP ACK 917 to the server 200. In the process of FIG. 9, a short TCP RTT is already achieved for the first TCP data 901 of the TCP session. However, for the first TCP data/TCP ACK transaction some overscheduling of the UE 10 may occur due to the multiple UL grants 904, 904', 904".

For further TCP data, the sequence from sending the TCP data 911 to receiving the TCP ACK 917 may be repeated.

Figure 10:
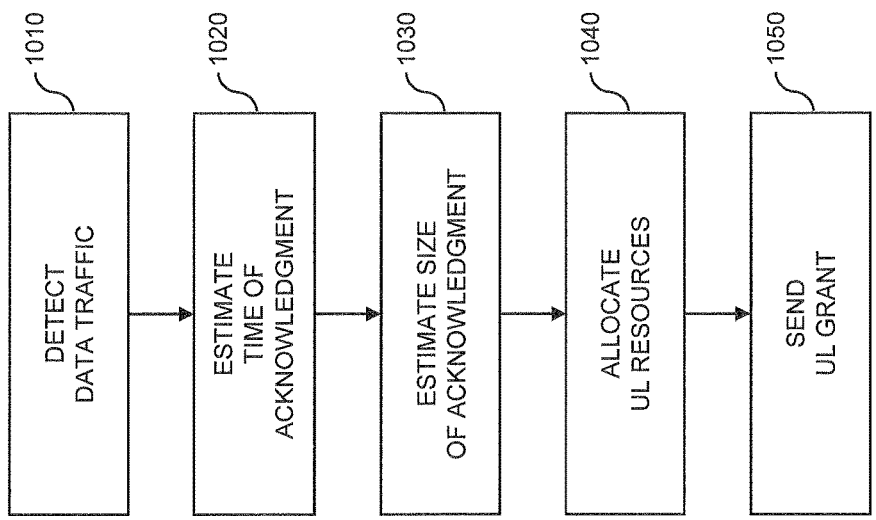
FIG. 10 shows a flowchart for illustrating a method according to an embodiment of the invention.

FIG. 10 shows a flowchart for illustrating a method of controlling radio transmission in a cellular network. The method may be used for implementing the above-described concepts in a network node of the cellular network. In particular, this node may be responsible for scheduling radio transmissions, such as an eNB when using LTE radio access technology or an Radio Network Controller (RNC) when using UMTS radio access technology.

At step 1010, the network node detects data traffic between the cellular network and a UE. The detected data traffic is based on a transport protocol which involves transmission of an ACK to acknowledge successful reception of data by the UE. For example, the transport protocol may correspond to the TCP. The data traffic of the transport protocol may be detected by inspecting data traffic of the UE, e.g., using packet inspection for analyzing protocol headers.

At step 1020, the network node estimates a time at which sending of an future ACK by the UE is expected. This estimation may involve determining an estimated time interval between sending of data to the UE and reception of the ACK for this data. The sender may for example be a server, such as the server 200, and the time interval may correspond to an end-to-end RTT of the transport protocol, such as illustrated in connection with FIG. 7. The time interval may also be determined at some intermediate node, as for example illustrated in connection with FIG. 7 where the eNB 100 corresponds to such intermediate node. The estimation of the time may be based on information obtained by packet inspection.

In some scenarios, the estimation of the time may also involve determining a transmission delay between the network node and a sender of the data, as for example explained in connection with FIG. 7 for the delay T1 between the eNB 100 and the server 200.

In some scenarios, the estimation of the time may further be based on information from AQM for a radio link between the cellular network and the UE. For example, such information may allow to take into account that certain data packets are discarded due to congestion and that no ACK is to be expected for the data in such discarded data packets.

In some scenarios, the estimation of the time may further be based on an expected time interval between availability of UL data at the UE and sending of a scheduling request by the UE to obtain UL radio resources for sending the UL data, e.g., as explained in connection with FIGS. 7 and 8 for the time interval T5.

In some scenarios, the estimation of the time may alternatively or additionally be based on evaluating parameters of a retransmission protocol implemented between the cellular network and the UE. For example, the working point of a HARQ protocol may be evaluated.

The estimation of the time may specifically involve determining a waiting time between sending data of said data traffic from the network node to the UE and sending a UL grant indicating the allocated uplink radio resources from the network node to the UE, e.g., as explained in connection with FIGS. 7 to 9 for the waiting time TW.

At step 1030, the network node may further estimate a size of the future ACK. For example, this may involve determining an estimated size of a window for data which a sender is currently allowed to send in according to the transport protocol. The estimation of the size may be based on information obtained by packet inspection.

In some scenarios, the estimation of the size may further be based on information from AQM for a radio link between the cellular network and the UE. For example, such information may allow to take into account that the size of data packets is adjusted due to congestion and that the size of the future ACK may be limited by such adjusted data packet size.

At step 1040, the network node allocates UL radio resources to the UE. This is accomplished on the basis of the time as estimated at step 1020 and optionally also on the basis of the size as estimated at step 1030.

At step 1050, the network node indicates the allocated UL radio resources to the UE. As mentioned above, this may be accomplished by sending an UL grant to the UE. As explained above, the UL grant may be sent after a waiting time from the sending of data from the network node to the UE, and this waiting time may be determined in accordance with the time estimated at step 1020, as for example explained above for the waiting time TW.

Figure 11:
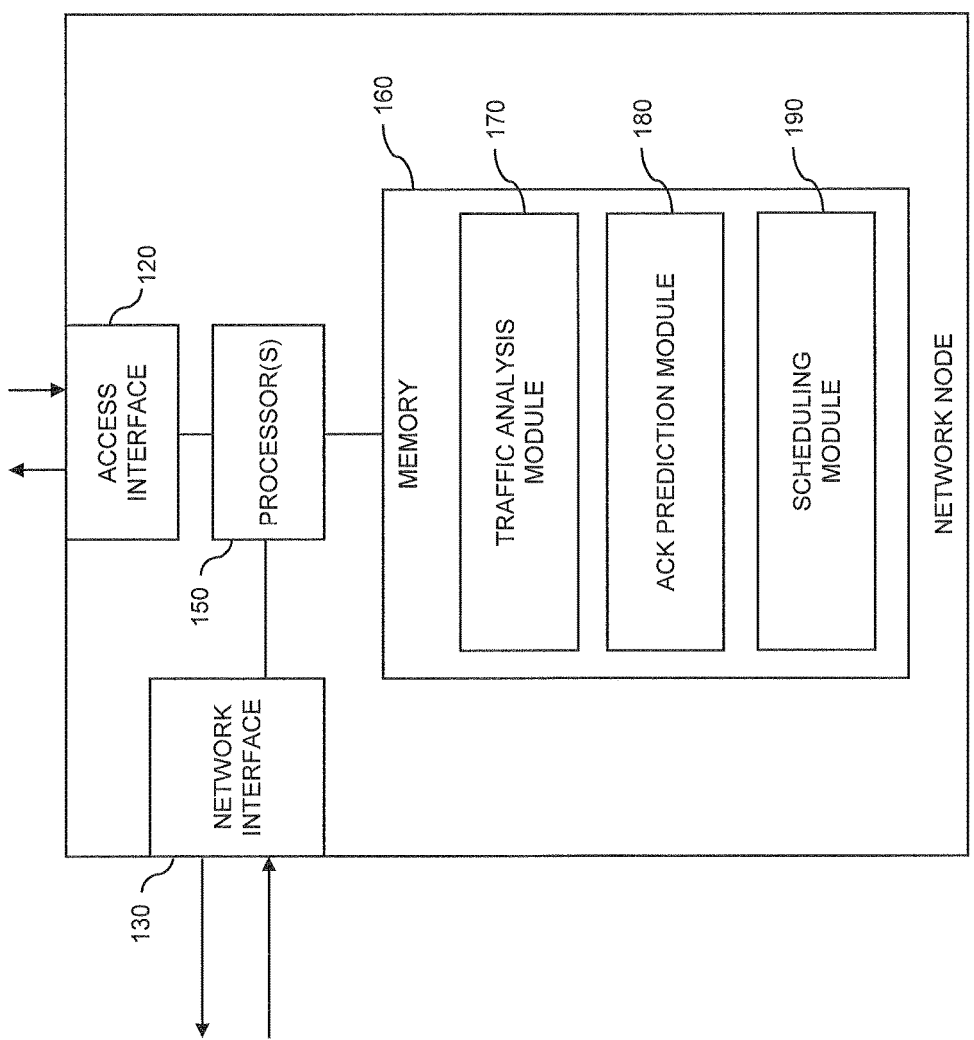
FIG. 11 schematically illustrates implementation of a network node according to an embodiment of the invention.

FIG. 11 illustrates exemplary structures which may be used for implementing the above concepts in a network node of a cellular network.

As illustrated, the network node may include a radio interface 120, e.g., if the node is implemented as a base station which is also responsible for scheduling radio transmissions, such as an eNB in the LTE radio access technology. The radio interface 120 may then be used for establishing a radio link to UEs in a cell served by the node. In some scenarios, the radio interface 120 may also be used for establishing a wired connection to a separate radio unit, e.g., if the node is implemented as an RNC. Further, the node may also be provided with a network interface 130 for connecting to other nodes, e.g., to servers.

Further, the network node includes one or more processors 150 coupled to the interfaces 120, 130, and a memory 160 coupled to the processor(s) 150. The memory 160 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the network node. In particular, the memory 160 may include a traffic analysis module 170 for implementing the above-described functionalities for detecting and/or analyzing data traffic which is based on a certain transport protocol. Further, the memory 160 may also include an ACK prediction module 180 for implementing the above-mentioned functionalities predicting the time and/or size of a future ACK. Still further, the memory 160 may include a scheduling module for implementing the above-mentioned functionalities of allocating UL radio resources and generating UL grants depending on the estimated time and/or size of a future ACK.

It is to be understood that the structures as illustrated in FIG. 11 are merely schematic and that the network node may actually include further components which, for the sake of clarity, have not been illustrated, e.g., further interfaces or processors. Also, it is to be understood that the memory 160 may include further types of program code modules, which have not been illustrated, e.g., program code modules for implementing known functionalities of an eNB or RNC. According to some embodiments, also a computer program may be provided for implementing functionalities of the network node, e.g., in the form of a physical medium storing the program code and/or other data to be stored in the memory 160 or by making the program code available for download.

As can be seen, the concepts as described above may be used highly efficient transmission of data using a transport protocol. Specifically, delays due to sending of scheduling requests may be avoided. This may be achieved without undue waste of radio resources.

It is to be understood that the examples and embodiments as explained above are merely illustrative and susceptible to various modifications. For example, the concepts could be applied in connection with other transport protocols which involve acknowledgement of received data, such as the Stream Control Transmission Protocol (SCTP) or the Reliable User Datagram Protocol (RUDP). Further, some of the described functionalities may be distributed in different network nodes. For example, packet inspection functionalities could be implemented separately from scheduling functionalities. Further, the illustrated network nodes may be implemented by a single device or by a system of multiple devices. Moreover, it is to be understood that the above concepts may be implemented by using correspondingly designed software to be executed by one or more processors of an existing device, or by using dedicated device hardware.

The invention claimed is:

1. A method of controlling radio transmission in a cellular network, the method comprising:
   detecting, by a network node, data traffic between a sender sending data in the cellular network and a user equipment, the data traffic being based on a transport protocol which involves transmission of an acknowledgement to acknowledge successful reception of data by the user equipment;
   determining, by the network node, an estimated time interval between the sender sending data to the user equipment and reception of the acknowledgement at the network node for this data from the user equipment;
   determining, by the network node, a transmission delay between the network node and the sender of the data, wherein the transmission delay comprises the time between the sender of the data sending the data and the network node receiving the data;
   based on the estimated time interval and the transmission delay, estimating by the network node, an estimated time at which sending of a future acknowledgement by the user equipment is expected;
   on the basis of the estimated time at which sending of the future acknowledgement by the user equipment is expected, allocating, by the network node, uplink radio resources to the user equipment; and
   indicating, by the network node, the allocated uplink radio resources to the user equipment.

2. The method according to claim 1, further comprising:
   estimating by the network node a size of the future acknowledgement to determine an amount of uplink radio resources needed to transmit the future acknowledgement; and
   allocating by the network node the uplink radio resources on the basis of the estimated size.

3. The method according to claim 2,
   wherein said estimating comprises determining an estimated size of a window of data which a sender is currently allowed to send according to the transport protocol.

4. The method according to claim 2,
   wherein said detecting and/or estimating is performed based on inspecting data traffic of the user equipment.

5. The method according to claim 2,
   wherein said estimating is performed based on evaluating parameters of a retransmission protocol implemented between the cellular network and the user equipment.

6. The method according to claim 2,
   wherein said estimating is performed based on information from active queue management for a radio link between the cellular network and the user equipment.

7. The method according to claim 1,
   wherein said estimating is performed based on an expected time interval between availability of uplink data at the user equipment and sending of a scheduling request by the user equipment to obtain uplink radio resources for sending the uplink data.

8. The method according to claim 1,
   wherein said estimating comprises determining a waiting time between sending data of said data traffic from the network node to the user equipment and sending an uplink grant indicating the allocated uplink radio resources from the network node to the user equipment.

9. A network node for a cellular network, the network node comprising:
   an interface for transmission of data packets with respect to a user equipment; and
   at least one processor, wherein the at least one processor is configured to:
   detect data traffic between a sender sending data in the cellular network and the user equipment, the data traffic being based on a transport protocol which involves transmission of an acknowledgement through the interface to acknowledge successful reception of data by the user equipment;
   determine an estimated time interval between the sender sending data to the user equipment and reception of the acknowledgement at the network node for this data from the user equipment;
   determine a transmission delay between the network node and a sender of the data, wherein the transmission delay comprises the time between the sender of the data sending the data and the network node receiving the data;
   based on the estimated time interval and the transmission delay, estimate an estimated time at which sending of a future acknowledgement by the user equipment is expected;
   on the basis of the estimated time at which sending of the future acknowledgement by the user equipment is expected, allocate uplink radio resources to the user equipment; and
   indicate the allocated uplink radio resources to the user equipment through the interface.

10. The network node according to claim 9, wherein the at least one processor is configured to:
   estimate a size of the future acknowledgement to determine an amount of uplink radio resources needed to transmit the future acknowledgement; and
   allocate the uplink radio resources on the basis of the estimated size.

11. The network node according to claim 10,
wherein said estimating comprises determining an estimated size of a window of data which a sender is currently allowed to send according to the transport protocol.

12. The network node according to claim 10,
wherein said detecting and/or estimating is performed based on inspecting data traffic of the user equipment.

13. The network node according to claim 10,
wherein said estimating is performed based on evaluating parameters of a retransmission protocol implemented between the cellular network and the user equipment.

14. The network node according to claim 10,
wherein said estimating is performed based on information from active queue management for a radio link between the cellular network and the user equipment.

15. The network node according to claim 9,
wherein said estimating is performed based on an expected time interval between availability of uplink data at the user equipment and sending of a scheduling request by the user equipment to obtain uplink radio resources for sending the uplink data.

16. The network node according to claim 9,
wherein said estimating comprises determining a waiting time between sending data of said data traffic from the network node to the user equipment and sending an uplink grant indicating the allocated uplink radio resources from the network node to the user equipment through the interface.

17. A computer program product comprising a non-transitory computer readable storage medium storing program code to be executed by at least one processor of a network node for a cellular network, wherein execution of the program causes the network node to operate in accordance with a method according to claim 1.

* * * * *